United States Patent [19]

Uemura

[11] Patent Number: 4,556,973
[45] Date of Patent: Dec. 3, 1985

[54] FREQUENCY-DIVISION MULTIPLEX COMMUNICATION METHOD AND SYSTEM

[75] Inventor: Hiroki Uemura, Tokyo, Japan

[73] Assignee: Pioneer Electronic Corp., Tokyo, Japan

[21] Appl. No.: 550,153

[22] Filed: Nov. 9, 1983

[30] Foreign Application Priority Data

Nov. 9, 1982 [JP] Japan .................... 57-196596

[51] Int. Cl.$^4$ .................... H04J 1/14; H04Q 11/04
[52] U.S. Cl. .................... 370/69.1; 370/76; 370/124; 358/142
[58] Field of Search .................... 370/69.1, 76, 124; 358/142, 143

[56] References Cited

U.S. PATENT DOCUMENTS

| | | | |
|---|---|---|---|
| 4,264,925 | 4/1981 | Freeman et al. | 358/143 |
| 4,310,854 | 1/1982 | Baer | 358/143 |
| 4,379,947 | 4/1983 | Wainer | 370/69.1 |
| 4,390,901 | 6/1983 | Keiser | 358/142 |

*Primary Examiner*—Douglas W. Olms
*Assistant Examiner*—Curtis Kuntz
*Attorney, Agent, or Firm*—Sughrue, Mion, Zinn, Macpeak & Seas

[57] ABSTRACT

A frequency-division multiplex communication method and system in which a data signal is multiplexed with a TV signal in such a manner that interference between the data signal and the video and audio TV signals is substantially eliminated without the need for filters having sharp skirts. A carrier signal, lying in a frequency band assigned to the audio signals, is inserted into the composite TV signal frequency shifted by a predetermined amount relative to the audio component. This carrier signal is FM modulated with a data signal. The modulated data signal is combined with the modulated audio signal for transmission. For receiving, the audio signal band is separated into separate bands. The modulated data signal is separated with the use of an inter-carrier signal between the modulated audio signal and at least one carrier signal from among the separated audio signal inband components. The separated data signal is then FM detected, and subsequently reproduced.

5 Claims, 3 Drawing Figures

FREQUENCY-DIVISION MULTIPLEX COMMUNICATION METHOD AND SYSTEM

BACKGROUND OF THE INVENTION

The present invention relates to a frequency-division multiplex communication system for multiplex transmission, such as a CATV system.

In the prior art, a system as shown in FIG. 1 has been known for a frequency division multiplex communication system of the same general type to which the invention relates. In this known system, an output signal from a video signal source 1 is amplitude modulated by a video modulator 2. A synchronizing signal present in that output signal is frequency multiplied by n by a frequency multiplier 3. Further, a first audio signal 21 is FM modulated by a first-audio modulator 4-1, and a second audio signal 22 is FM modulated by a second audio modulator 4-2. The two modulated signals are mixed by a mixer 5. A phase detector 6, employing a PLL loop utilizing the output from the frequency multiplier 3 as a reference signal which has a frequency of n times the horizontal synchronizing frequency of the video signal, produces a difference frequency signal between the respective output signals from the audio modulators 4-1 and 4-2. In turn, the output signal from the phase detector 6 is used as the oscillator input to the second audio modulator 4-2. A composite television signal is formed from the output signals from the video modulator 2, first audio modulator 4-1 and second audio modulator 4-2 and sent out by a signal transmitting unit 7 as a multiplex signal.

In the multiplex signal 23 obtained in this way, the second audio carrier signal is disposed at a frequency higher than the first audio carrier frequency specifically, by a frequency of $n \cdot f_H$ ($f_H$ is the horizontal synchronizing frequency). The level of the second audio carrier signal is set to a level lower than that of the first audio carrier level by 20 dB and more.

The TV signal including the foregoing multiplex signal 23 is applied to a TV receiver. Specifically, the TV signal is applied to the RF input of a tuner 8. The output of the tuner 8 is coupled to a mixer 9 and thence to an IF amplifier circuit 11. A local oscillator signal is supplied to the second input to the mixer 9 by an oscillator 10. The output of IF amplifier circuit 11 is AM detected by a detector 12, and the video component of detector output is applied through a video amplifier 13 to drive a cathode-ray tube 25. Further, an intercarrier output signal included in the detected output is FM detected and amplified by an audio detector/amplifier 14, and the resultant demodulated signal is reproduced by a loudspeaker 24.

A portion of the output signal from the IF amplifier circuit 11 is applied to a second IF amplifier circuit 15, the passband of which is set to emphasize the second modulated signal. The output of IF amplifier circuit 15 is inter-carrier detected by a detector 16. The thus-obtained signal is processed by a bandpass filter 17 with which the first audio signal and other unnecessary signal components are eliminated. The resulting signal is FM demodulated by an FM detector 18 and input to a reproducing unit 20 through an amplifier 19.

In the case of the conventional frequency-division multiplex communication system utilizing an additional carrier signal as described above, the following problems are present:

(1) In order to reduce interference between the second audio signal and the video and/or the first audio signal, it is necessary to lower the level of the second audio relative to the video carrier level by 26 dB or more and to suppress the same below the level of the first audio signal. Thus, the bandpass filter 17 is required to have considerably sharp skirts for adequate separation of the modulated second audio signal.

(2) For easy separation of the modulated second audio signal, it is necessary to provide a large frequency difference between the first audio carrier and the second audio carrier. However, if this frequency difference is made excessively large, interference with the video signal results, particularly with the upper (higher frequency) side because it becomes necessary to push the carrier of the second audio signal to a lower frequency.

(3) In order to reduce "buzz", which can interfere with the second audio signal prior to demodulation, it is necessary to include a circuit, such as the second IF amplifier circuit 15, to emphasize the level of the modulated second audio signal, thereby to reduce the level difference relative to the video signal.

(4) In order to reduce the effects of "buzz", a direct receiving arrangement employing a split-carrier system has been known. However, an improvement of the selectivity thereof, as would be necessary to give fully acceptable results, gives rise to another troublesome problem, namely, the stability of the received frequency is required to be very high.

The present invention was achieved in view of the drawbacks described above in the prior art. Thus, an object of the invention is to provide a frequency-division multiplex communication system in which the second audio signal is spaced in frequency not far from the first audio carrier, has a level which gives rise to no interference with the first audio signal, does not require a receiver having a remarkably high selectivity, and is not subjected to "buzz" interference or interference with the first audio signal.

SUMMARY OF THE INVENTION

In accordance with the above and other objects, the invention provides a frequency-division time multiplex system in which a new carrier signal is added in a frequency band assigned to the audio signal. At least one signal, which is derived by shifting the modulated audio signal a certain frequency, is utilized as the carrier signal. This carrier signal is FM modulated by a data signal or the like, and, at the time of sending out the TV signal, the thus-modulated signal is mixed with the TV signal and then transmitted. On the receiving side, the audio signal components are separated in frequency, the foregoing modulated signal is separated using an intercarrier between the audio signal and at least one modulated signal among the separated audio signal in-band components, and then FM detected.

DESCRIPTION OF THE PREFERRED EMBODIMENTS

Figure 2:
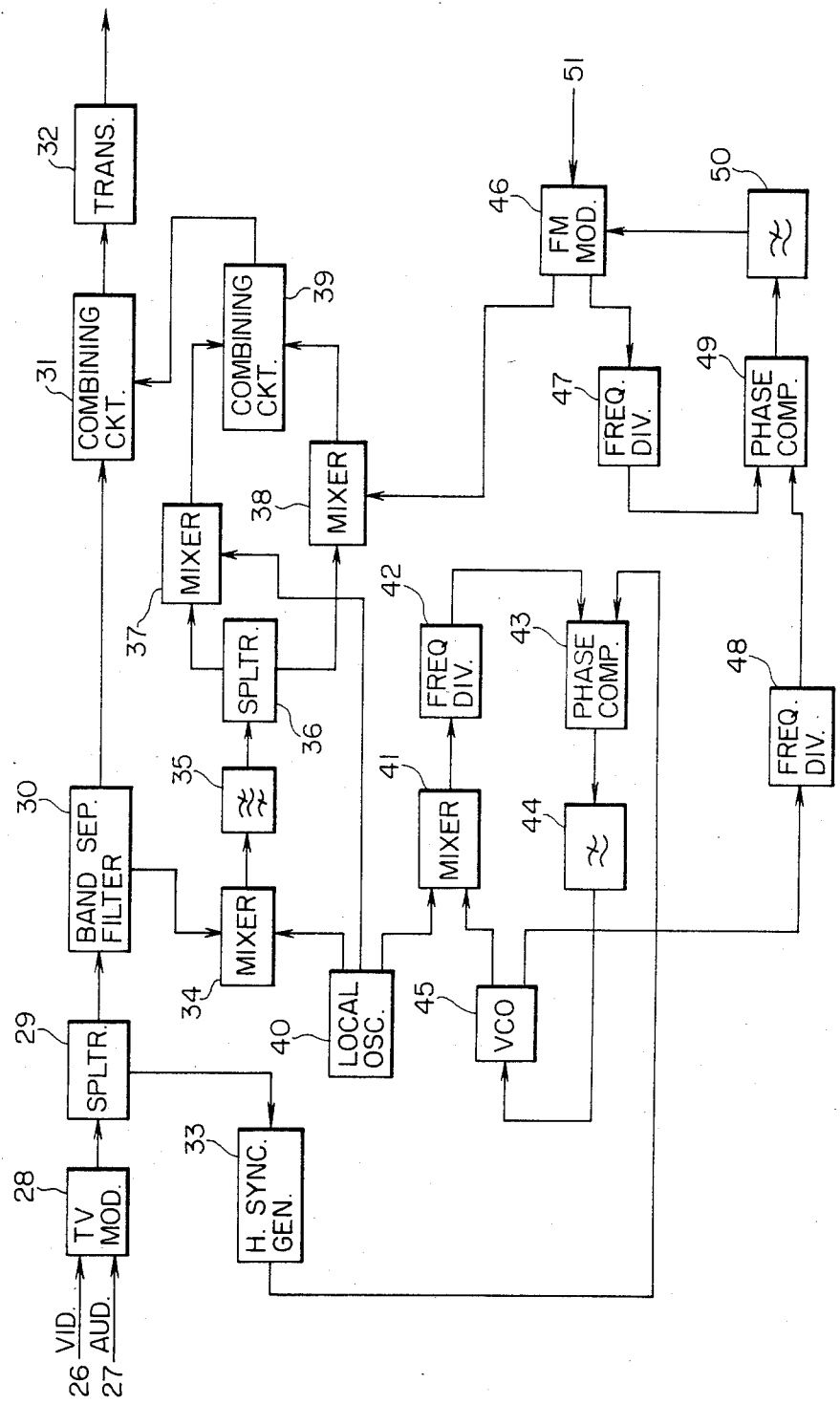
FIG. 2 is a block diagram showing a transmitting system used in a frequency-division multiplex communication system of the invention.

A preferred embodiment of a frequency-division multiplex communication system of the invention will now be described in detail with reference to FIGS. 2 and 3. FIG. 2 shows an example of a signal transmitting device of the invention. In FIG. 2, 26 indicates a video signal and 27 an audio signal. These 26 and 27 signals are modulated by a TV modulator 28 to produce an IF signal. This IF signal is passed to a splitter circuit 29, one output of which is applied to the input of a band separating filter 30 where it is frequency separated into video and audio components. The thus-separated video signal is combined by a first combining circuit 31 with a hereinafter described audio signal, multiplex signal or the like, and then the resulting signal is shifted to a desired TV channel frequency by a frequency-converting transmitting unit 32 for subsequent transmission.

The separated audio signal from a second output of the filter 30 is frequency converted by a first mixer 34 and local oscillator 40 to a frequency of, for example, 10.7 MHz. After passing through a bandpass filter 35, the signal is divided into two parts by a splitter 36. One of the two signal parts is converted to an initial IF audio frequency by a second mixer 37, again using the output signal of the local oscillator 40, and then inputted to a second combining circuit 39. The other of the two signal parts is modulated by a third mixer 38 using as a mixing signal the output of a hereinafter-described voltage-controlled oscillator based FM modulator 46. The output of the second combining circuit 39 is applied to one input of the first combining circuit 31.

The second output from the splitter circuit 29 is applied to a horizontal synchronizing signal generator 33 which produces in response thereto a horizontal synchronizing signal for the video signal. The horizontal synchronizing signal is applied to a first phase comparator 43. Reference numeral 45 indicates a voltage-controlled oscillator, the output of which determines the frequency of the output of the third mixer 38. The output of the voltage-controlled oscillator 45 is applied, together with the output of the local oscillator 40, to a mixer 41. In this mixer 41, a signal representing the frequency difference between the two signals is produced and applied to a frequency divider 42, which provides as an output a signal having a frequency which is 1/N times the difference frequency, where N is a positive integer. The latter signal is coupled to a second input of a phase comparator 43.

The resultant output of the phase comparator 43 is applied through a low-pass filter 44 to the voltage-controlled oscillator 45 to control its oscillation frequency. This oscillation frequency is $f_L - N \cdot f_H$ or $f_L + N \cdot f_H$, where $f_L$ is the oscillation frequency of the local oscillator 40 and $f_H$ is the horizontal synchronizing signal frequency. A portion of the thus-obtained oscillator output signal is frequency-divided by M (a positive integer) by a third frequency divider 48 and applied to a second phase comparator 49 as a reference signal for the phase-locked loop.

The output of the phase comparator 49 is smoothed by a low-pass filter 50, and then applied as the oscillator input to the FM modulator 46. The FM modulator 46 functions not only as part of a phase-locked loop, but also performs FM modulation of a signal 51, which may be a data signal. The modulation signal is limited to a signal not including a direct-current component, such as a BPS signal. A portion of the resulting signal is frequency divided by M by a frequency divider 47, and then applied as the other input signal to the phase comparator 49. Accordingly, the output frequency of the FM modulator 46 is maintained equal to the oscillation frequency of the voltage-controlled oscillator 45. The modulated data signal on the output of the FM modulator 46 is applied to one input of the mixer 38, the other input of which receives the 10.7 MHz audio signal from the splitter 36. The audio signal is thus FM modulated by the data signal.

The frequency of the resultant converted carrier has a value of $f_{AIF} - N \cdot f_H$ or $f_{AIF} + N \cdot f_H$, where $f_{AIF}$ is the audio IF carrier frequency and $f_H$ is the frequency of the modulated data signal from the FM modulator 46. This signal, which is to be multiplexed, is applied to the combining circuit 39 and combined with the audio IF signal.

As described above, these signals and the video signal separated by the band separating filter 30 are combined in the first combining circuit 31. In the frequency-converting transmitting unit 32, the carrier frequency of the multiplex signal is shifted to a frequency position higher or lower than the audio carrier wave by $N \cdot f_H$.

The phase relationship between the audio signal and the multiplex signal will now be derived. It is assumed that the audio signal, which is the input signal to the mixer 38 has the following form:

$$e_1 = A \cdot \cos(\omega_1 + m_A \sin \theta_1 t)t, \tag{1}$$

where A is a constant, $\omega_1$ is the angular frequency of the carrier, $m_A$ is the modulation index, $\theta_1$ is the angular frequency of the audio signal, and t is time. The modulated data signal from the modulator 46 can be represented by:

$$e_D = C \cdot \cos\{(1_D + m_D \cdot \sin R_D t)t + \psi_1\}, \tag{2}$$

where C is a constant, $\omega_D$ is the angular frequency of the data carrier, $m_D$ is the modulation index, and $\theta_D$ is the angular frequency of the data signal.

The desired output component from the mixer 38 is derived from multiplying the above two signals, and can be expressed as follows:

$$\begin{aligned} e_1 \times e_D &= A \cdot C \cos(\omega_1 + m_A \sin \theta_1 t)t \times \cos\{(\omega_D + \\ & m_D \cdot \sin \theta_D t)t + \psi_1\} = (\tfrac{1}{2}) A \cdot C [\cos\{(\omega_1 + \\ & \omega_D + m_A \sin\theta_1 t + m_D \sin\theta_D t)t + \psi_1\} + \\ & \cos\{(\omega_1 - \omega_D + m_A \sin\theta_1 t - m_D \sin\theta_D t)t\psi_1\}]. \end{aligned} \tag{3}$$

In equation (3) above, the component having a frequency of $\omega_1 + \omega_D$ is expressed as follows:

$$e_{DIF} = D \cdot \cos\{(\omega_1 + \omega_D + m_A \sin \theta_1 t + m_D \sin \theta_D t)t + \psi_1\}. \tag{4}$$

In this equation, $D = A \cdot C/2$.

With respect to the audio signal, the signal input to the mixer 37 is expressed by the same equation as the equation (1). However, if the local oscillation input from the local oscillation 40 has the form of:

$$e_L = L \cdot \cos(\omega_L t + \psi_2), \tag{5}$$

where L and $\psi_2$ are unimportant constants whose values are determined relative to the corresponding constants for $e_1$ and $e_D$. The mixer output can be derived, similarly to the case of the data signal, as follows:

$$e_{AIF} = A' \cdot \cos\{(\omega_1 + \omega_L + m_A \sin \theta_1 t)t + \psi_2\}. \tag{6}$$

In equation (6) $A'$ is related to A and L.

Because the relationship between $\omega_D$ and $\omega_L$ is:

$$\omega_D = \omega_L - 2\pi N \cdot f_H, \tag{7}$$

the respective signals can be expressed as follows:

$$e_{AIF} = A' \cdot \cos\{(\omega_{AIF} + m_A \sin \theta_1 t)t + \psi_2\}, \tag{8}$$

and $$e_{DIF} = D \cdot \cos\{(\omega_{AIF} - 2\pi N f_H + m_A \sin \theta_1 t + m_D \sin \theta_D t)t + \psi_1\}. \tag{9}$$

Further, these signals are frequency converted by the frequency-converting transmitting unit 32, thereby to be shifted in frequency as follows:

$$e_{ARF} = A' \cdot \cos\{(\omega_{ARF} + m_A \sin \theta_1 t)t + \psi_2'\}, \tag{10}$$

Ps and $$e_{DRF} = D \cdot \cos\{(\omega_{ARF} - 2\pi N f_H + m_A \sin \theta_1 t + m_D \sin \theta_D t)t + \psi_1'\}. \tag{11}$$

The phase factors $\psi_1$ and $\psi_2$ are changed to $\psi_1'$ and $\psi_2'$, the exact values of which are not important, in the frequency shifting.

The receiving system will now be described with reference to FIG. 3. In FIG. 3, reference numeral 52 indicates the TV signal including the multiplex signal. This signal is frequency shifted by a converter 53 to a desired TV channel frequency. This converter 53 is controlled by a channel selection unit 56. The output of the converter 53 is divided into two parts by a splitter 54. One part, including both video and audio components, is applied to a TV receiver 55. The other part is passed through a bandpass filter 57 having a passband selected to pass the audio signal. Signal components adjacent the passed signal are detected by an intercarrier detector 58, amplified by an amplifier 59, and after being passed through a bandpass filter 60, applied to a limiter amplifier 61 where they are amplitude limited. They are then FM demodulated by an FM detector 52, and reproduced by a reproduction unit 63. The resultant signals correspond to a frequency converted version of the signals expressed by equations (10) and (11), and thus can be expressed as follows:

$$e_a = a \cdot \cos\{(\omega_A + m_A \sin \theta_1 t)t + \psi_1''\}, \tag{12}$$

and $$e_d = d \cdot \cos\{(\omega_A - 2\pi N f_H + m_A \sin \theta_1 t + m_D \sin \theta_D t)t = \psi_2''\} \tag{13}$$

Once again, the frequency shifting produces new phase factors $\psi_1''$ and $\psi_2''$ with different amplitudes a and d.

These signals are present in the levels a and b by the transmitting unit such that $e_d < e_a$. The frequency difference between $e_a$ and $e_d$ can then be detected by the intercarrier detector 58. The detector can be implemented by either an envelope detector or a homodyne-type detector. In the case of the homodyne detector, the following component is derived:

$$e = S \cdot \cos\{(2\pi N f_H + m_D \sin \theta_D t)t + \alpha\}. \tag{14}$$

The level S is related to the levels a and d and the phase factor $\alpha$ to $\psi_1''$ and $\psi_2''$. As can be seen from equation (14), no audio signal modulation component is present, solely the data modulation component.

Figure 1:
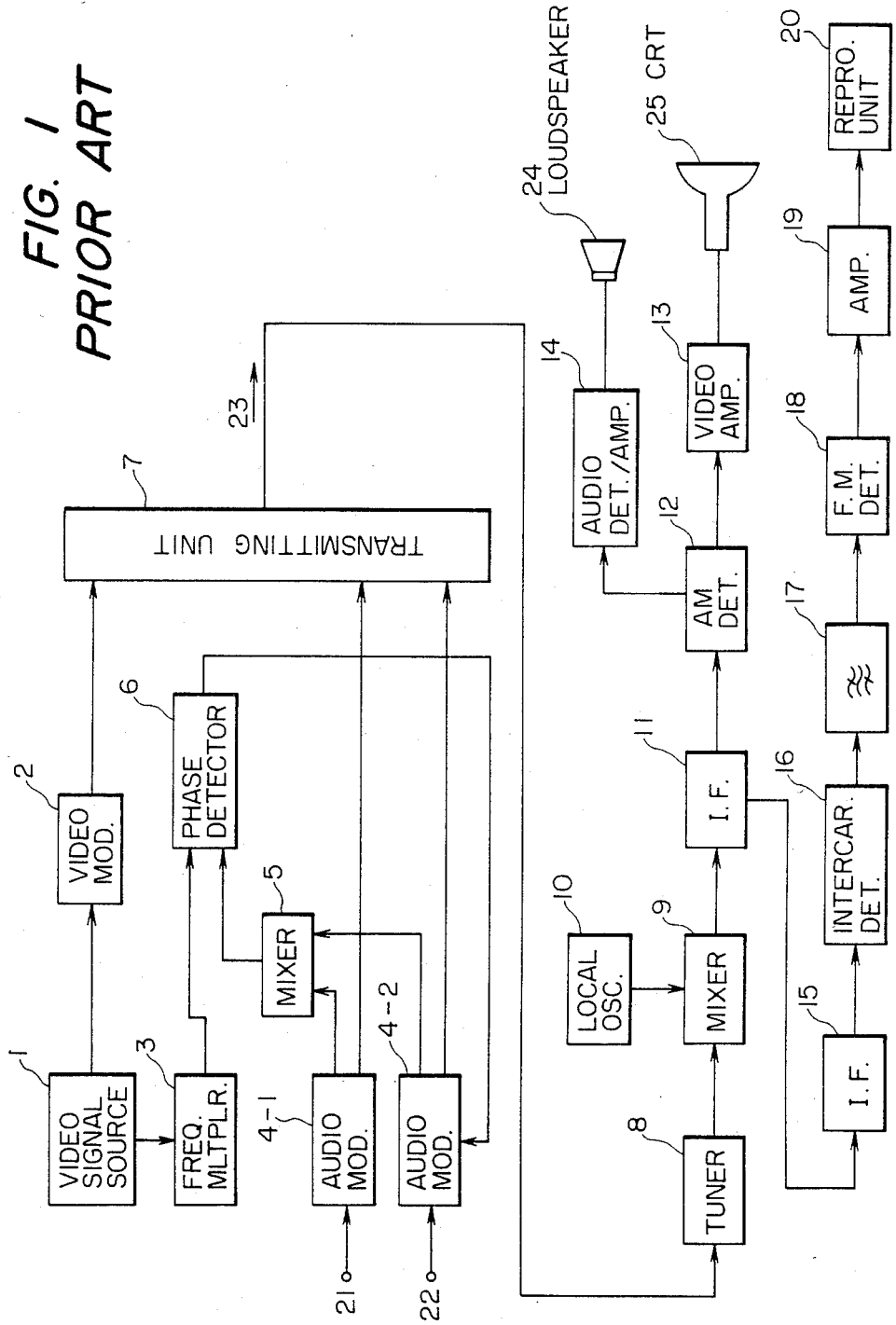
FIG. 1 is a block diagram showing a conventional frequency-division multiplex communication system.
Figure 3:
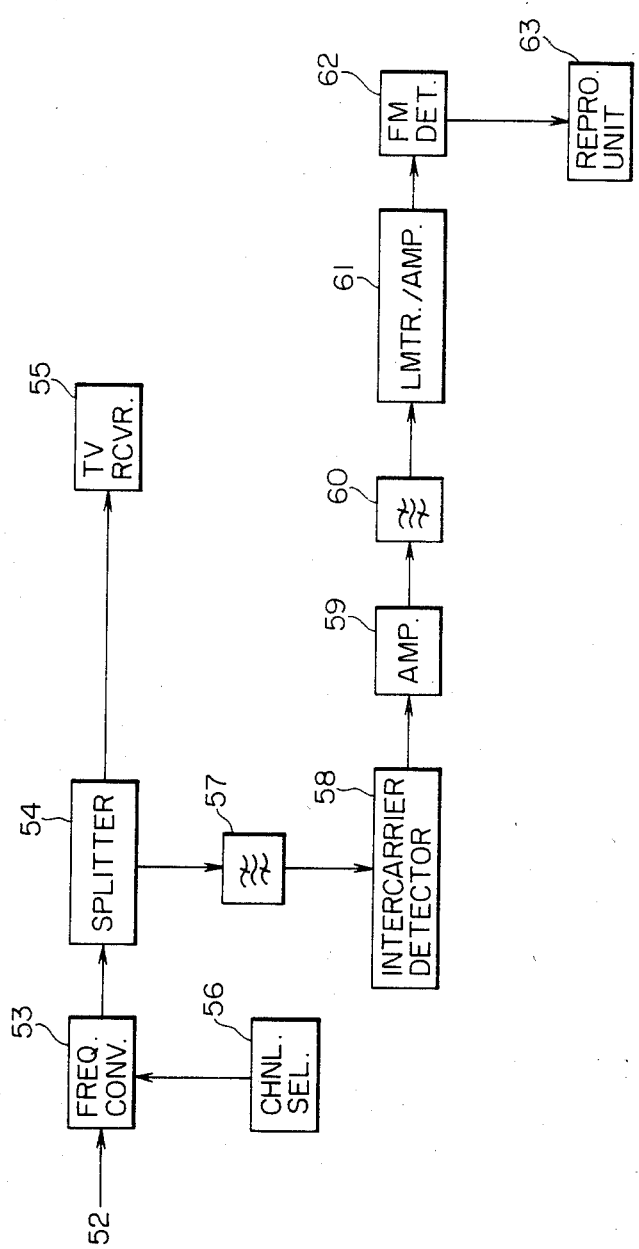
FIG. 3 is a block diagram showing a receiving system used in conjunction with the embodiment of FIG. 2.

Although in the embodiment described above the receiver unit is provided on the input side of the TV set, it is possible, as is the case of the receiver section shown in FIG. 1, to take out a signal portion from the signal which is frequency converted to the TV IF band and to utilize a bandpass filter (57) and the succeeding circuit elements of the system shown in FIG. 3 without modification.

As described in detail hereinabove, the invention has several features and advantages as below. More specifically, because the data signal is brought into the intercarrier detection process with the audio signal, a sharp bandpass filter is not necessary to separate the data signal, a large frequency difference is not required between the data carrier and the audio carrier, and no interference between the audio signal and data signal occurs. Because the frequency difference between the data carrier and audio carrier wave is made small, interference with adjacent channels is reduced, and a lower level of the data signal is made possible due to the improved receiver sensitivity. Further, "buzz" can easily be eliminated due to the use of the split carrier system. Also, a sharp selectivity for extracting the multiplex signal is not required, and to the contrary, a relatively low selectivity is sufficient to extract both the audio signal and the multiplex signal. Because separation of the data signal is achieved through an intercarrier detection process with the audio signal, frequency drift of the local oscillator in tne receiver causes little effect on the system.

I claim:

1. A frequency-division multiplex communication method of a type wherein a data signal is multiplexed with a TV signal, in which the improvement comprises the steps of:

for transmitting, inserting into a composite TV signal a modulated audio signal and at least one signal, having a first carrier signal shifted a predetermined frequency relative to a second carrier signal of said modulated audio signal, said one signal being inserted in a frequency band assigned to audio signals within said TV signal; FM modulating said first carrier signal with a data signal; combining the modulated data signal with said modulated audio signal prior to said inserting; and for reception, frequency separating signals contained in said frequency band; separating the modulated data signal from said separated signals in said frequency band by means of an intercarrier signal arising between said modulated audio signal and said at least one carrier signal; and FM detecting the separated data signal.

2. A frequency-division multiplex communication method comprising the steps of;

splitting a TV signal, containing video and audio information, into two parts;

separating a first part of said TV signal into video and audio components;

mixing said audio component with a local oscillator signal to shift said audio component to a first predetermined frequency;

combining signals produced as a result of mixing said shifted audio component with said local oscillator signal and said reference signal with said video component and transmiting the resulting combined signal;

producing said reference signal by steps of deriving horizontal synchronizing pulses from signals contained in a second part of said TV signal, producing a signal phase locked to said horizontal synchronizing pulses, FM modulating a data signal, frequency dividing the modulated data signal, phase comparing the frequency-divided FM data signal with said signal phase locked to said horizontal synchronizing pulses, and controlling said FM modulating of said data signal in accordance with a signal produced as a result of said phase comparing, said FM modulated data signal being applied as said reference signal.

3. The communication method of claim 2, further comprising, the reception of the transmitted signal, receiving the transmitted signal; frequency converting the received signal; dividing the received, frequency-converted signal into two parts, and applying a first part to a TV receiver; detecting an intercarrier signal in the second part of the received, frequency-converted signal; amplifying and limiting the detected intercarrier signal; FM detecting the limited and amplified signal; and reproducing said data signal in response to the FM detected signal.

4. A frequency-division multiplex communication system comprising; a TV modulator for producing TV signal in response to baseband video and audio input signals; a first splitter having an input coupled to output of said TV modulator; a band separating filter, having an input coupled to a first output of said first splitter, for dividing a portion of the modulated TV signal into video and audio components on first and second outputs, respectively, of said filter; a horizontal synchronizing pulse generator having an input coupled to a second output of said first splitter for extracting horizontal synchronizing pulses from a second portion of said TV signal; a local oscillator; a first mixer having a first input coupled to said second output of said band separating filter and a second input coupled to an output of said local oscillator; a first low-pass filter coupled to filter an output of said first mixer; a second splitter having an input coupled to an output of said first low-pass filter; second and third mixers having respective first inputs coupled to respective first and second outputs of said second splitter; combining circuit means for producing a composite signal from signals present on said first output of said band separating filter and outputs of said second and third mixers; means for transmitting said composite signal; a phase-locked loop receiving as inputs said output of said local oscillator and horizontal synchronizing pulses produced by said horizontal synchronizing pulse generator; a first frequency divider receiving an output of said phase-locked loop; an FM modulator for modulating a data signal at a frequency determined by a control signal applied to said FM modulator, a second input of said second mixer being coupled to said output of said local oscillator, and a second input of said third mixer being coupled to an output of said FM modulator; a second frequency divider having an input coupled to said output of said FM modulator; a phase comparator receiving as inputs outputs of said first and second frequency dividers; and a second low-pass filter receiving as an input an output of said phase comparator, an output of said second low-pass filter forming said control signal.

5. The frequency-division multiplex communication system of claim 4, further comprising, for receiving and demodulating the transmitted signal: a frequency converter and a channel selector for frequency converting the received to a predetermined frequency band; a third splitter for splitting the received, frequency-converted signal into first and second portions, said first portion being applied as an input to a TV receiver; a band-pass filter coupled to filter an output signal on second output of said filter splitter; an intercarrier detector for detecting an intercarrier signal present on an output of said band-pass filter; means for amplifying and limiting the detected inter-carrier signal; an FM detector for FM detecting the amplified and limited signal; and means for reproducing the data signal from the output of said FM detector.

* * * * *